July 26, 1938.  W. J. MORRISSEY  2,124,587
MOTION PICTURE PROJECTOR
Filed Nov. 26, 1934   3 Sheets-Sheet 1
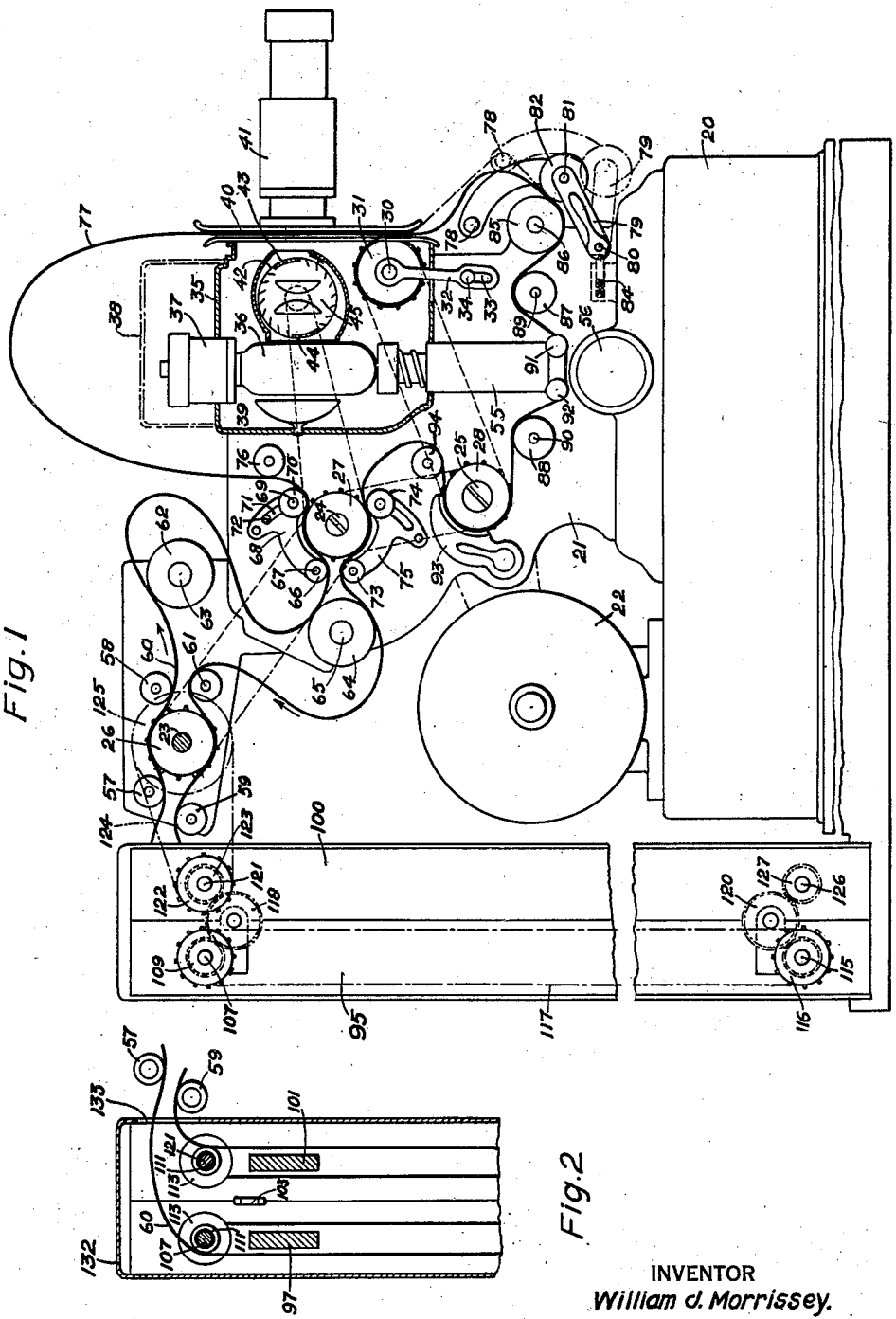
INVENTOR
William J. Morrissey.
BY Van Deventer & Grier
ATTORNEYS

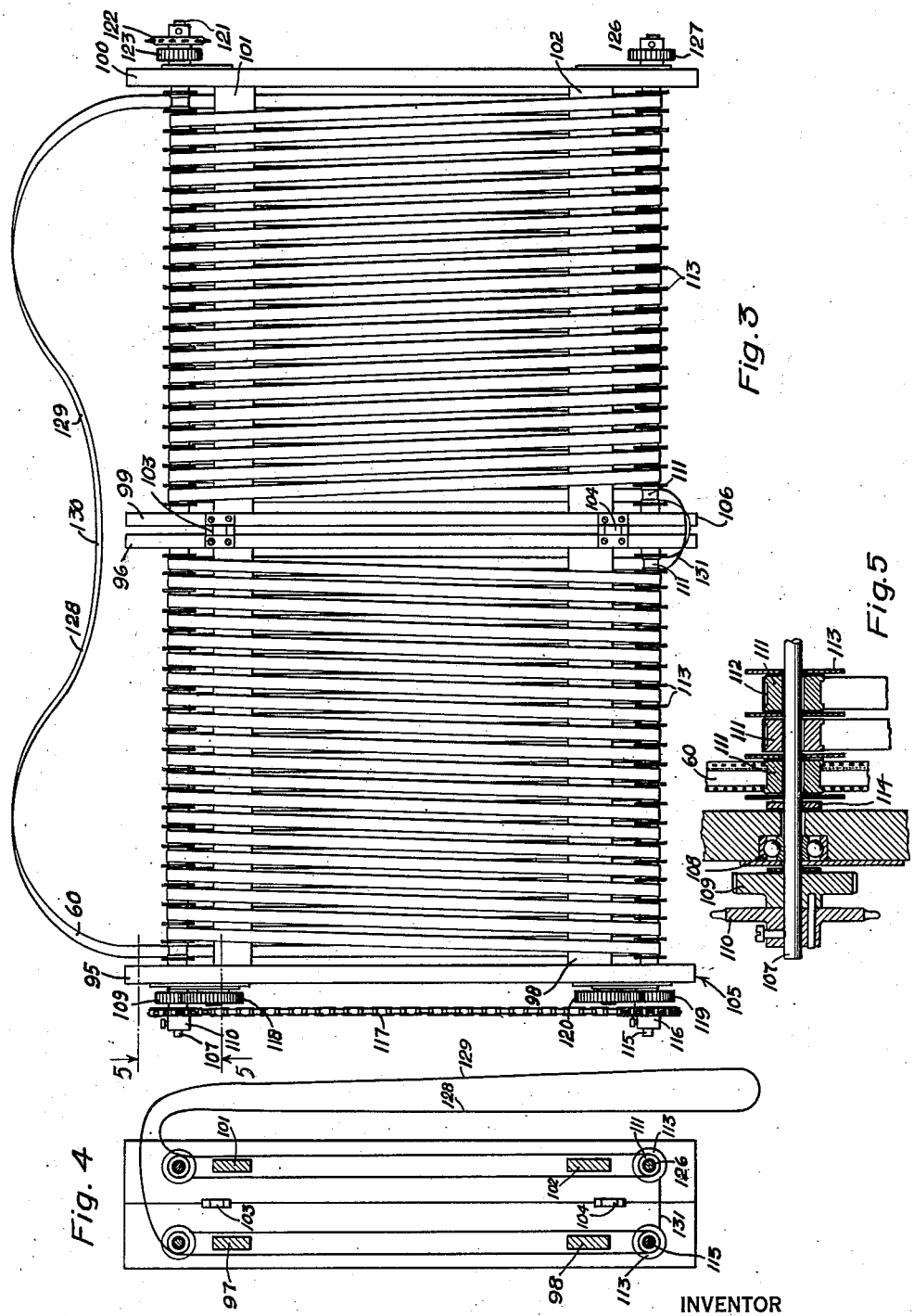

July 26, 1938. W. J. MORRISSEY 2,124,587
MOTION PICTURE PROJECTOR
Filed Nov. 26, 1934 3 Sheets-Sheet 3
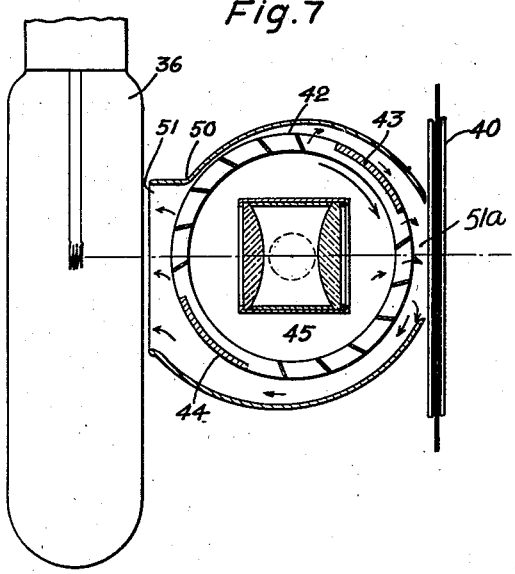
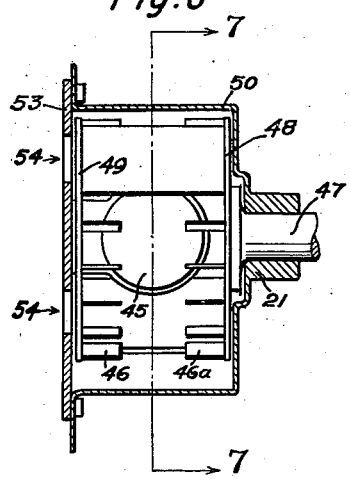
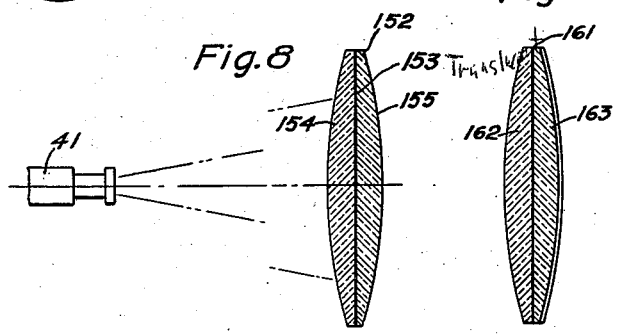
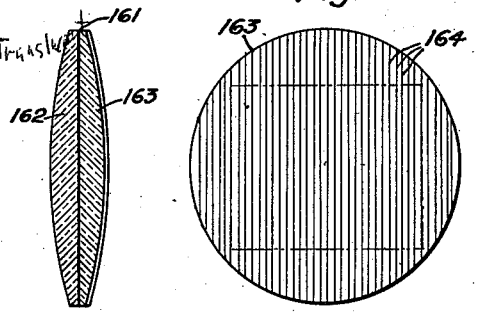
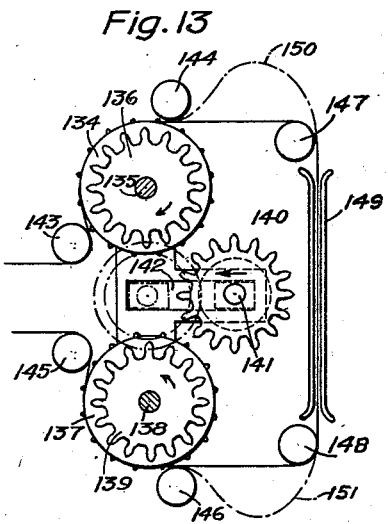
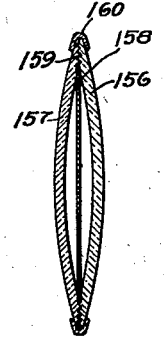
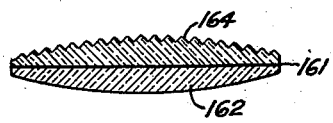
INVENTOR
William J. Morrissey
BY Van Deventer + Grier.
ATTORNEYS Patented July 26, 1938

2,124,587

UNITED STATES PATENT OFFICE 2,124,587

MOTION PICTURE PROJECTOR

William J. Morrissey, Brooklyn, N. Y.

Application November 26, 1934, Serial No. 754,697

2 Claims. (Cl. 88—16.2)

This invention relates to improvements in motion picture projectors and has for its principal object the provision in a projector of a film holder carrying an endless strip of film and driven in timed relation to the projector and adapted to feed film to the sprockets of the projector and take up film from the projector at the same rate as it is utilized by the projector.

A further object of the invention is the provision of a film holder containing a plurality of film carrying rollers frictionally carried on rotating shafts in said holder thereby minimizing the continuous pull and wear on the film.

Another object of the invention is the provision in a projector of a combined shutter and fan surrounding the condensing lenses of the projector, some of the blades being adapted to interrupt light passing through the condenser and other blades arranged to induce the flow of air without cutting the beam of light passing through the condenser, said fan being utilized to cool the film, the condensing lenses and the projection lamp.

Still another object of this invention is the provision of a projection system of a screen comprised of a plurality of plano-convex lenses with the plain surfaces adjacent to each other with a screen of translucent material disposed between.

Another object of the invention is the provision in a projector of an automatic loop making device.

Other objects and advantages of this invention will be apparent to those skilled in the art.

Referring to the drawings:

Figure 1 is a side elevation of a projector showing an embodiment of the invention;

Figure 2 is a cross sectional view of the film holder showing the arrangement of the feed and take-up rollers;

Figure 3 is a side elevation of the film holder in its open position;

Figure 4 is a sectional elevation of the film holder showing the arrangement of the film thereon; one of the holders is in the normal or closed position;

Figure 5 is a cross sectional view of the driven shaft and friction rollers taken along the line 5—5 of Figure 3;

Figure 6 is a view partly in section of the combined shutter and fan for cooling the condensing lens, the film and the projector lamp;

Figure 7 is a sectional elevation of Figure 6 taken along the line 7—7;

Figure 8 is an elevation partly in section showing the new and improved projection screen;

Figure 9 is a front elevation of a modified form of screen similar to that shown in Figure 8;

Figure 10 is a sectional elevation of the screen shown in Figure 9;

Figure 11 is a cross sectional view of the screen shown in Figure 9 taken at right angles to the section shown in Figure 10;

Figure 12 is a sectional elevation showing a further modification of the screen shown in Figure 8; and Figure 13 is an elevation showing an arrangement of an automatic loop-setting device.

Referring to Figure 1, a projector base 20 carries a projector frame 21 and an electric motor 22. The frame 21 is provided with bearings (not shown) carrying shafts 23, 24 and 25. The shaft 23 has secured thereto a sprocket 26, and the shafts 24 and 25 are provided with sprockets 27 and 28 respectively.

An intermittent motion (not shown) which may be of the usual "Geneva" type is adapted to actuate a shaft 30, and a sprocket 31 secured to the shaft 30 is adapted to move the film in steps through the film gate which will presently be described.

The intermittent movement together with the shaft 30 and the sprocket 31 is movable on the frame 21 so that the picture may be "framed." The framing is accomplished by moving the arm 32 up or down.

A slot 33 formed in the arm 32 engages a stud 34 secured to the frame 21 and thereby the up and down movement of the arm 32 is limited.

A lamphouse 35 is secured to the frame 21 and is provided with a projection lamp 36 supported by a removable socket 37. In the modification shown, the socket 37 extends through the lamphouse and may be provided with a suitable cover 38 as shown in dotted lines in Figure 1. This cover serves to encase the wiring and to prevent the film from coming in contact with any rough surfaces.

The lamphouse 35 is also provided with a suitable reflector positioned in line with the filament in the lamp. The frame 21 carries a film gate 40 which may be of the conventional type and provided with the usual aperture plate. An objective lens 41 is positioned in registration with the aperture plate and the film gate.

A shutter, designated generally by the numeral 42, Figures 1 and 7, is preferably positioned between the projection lamp 36 and the objective lens 41 and is provided with blades 43 and 44 for cutting off the light while the intermittent sprocket is advancing the film one frame or picture. A pair of condensing lenses 45 are positioned within the shutter 42. The shutter 42 in addition to the blades 43 and 44 carries a plurality of vanes 46 and 46a. These vanes form a blower.

The shutter shaft 47 is provided with a disc 48 to which the blades 43, 44 and the vanes 46a are secured. An annular ring 49 is secured to the opposite ends of the blades 43 and 44 and the vanes 46 are secured to this ring and positioned in line with vanes 46a. Except for the blades 43 and 44 the resultant structure is similar to the rotor of a "Sirocco" type blower. The space between the ends of the vanes 46 and the ends of the vanes 46a is provided so that these vanes do not cut the beam of light passing from the projection lamp to the objective lens. A housing 50 embraces the shutter 42 and is provided with a discharge opening 51 positioned adjacent to the projection lamp 36. The housing 50 is also provided with an opening 51a which is positioned adjacent to the aperture plate in the film gate 40. The housing 50 has one side thereof open, Figure 6, so that in assembling the shutter 42 may be passed therethrough. This open side is provided with a removable closure plate 53 having a series of holes designated by the numeral 54 formed therein and through which air may pass.

The plate 53 is also provided with a suitable support adapted to position the condensing lenses 45 in line with the projection lamp filament and the objective lens. The condensing lenses may be removed for cleaning or replacing by removing the plate 53.

An optical unit 55 is positioned in line with the filament of the projection lamp and is preferably at right angles of tthe beam of light used for projecting the picture. In the embodiment shown, this optical unit is preferably adjacent to or in contact with the end of the projection lamp 36. This optical unit scans the sound track of the film as will presently be described.

A light sensitive cell 56 is positioned relative to the optical unit to receive a beam of light from the latter.

The sprocket 26 has upper rollers 57 and 58 pivoted on the frame 21 and adapted to keep the film 60 in contact with the upper surface of the sprocket 26. This sprocket also has rollers 59 and 61 adjacent thereto and adapted to keep another portion of the film 60 in contact with the sprocket 26 and in engagement with the teeth thereof.

A large roller 62 is freely rotatable on a stud 63 carried by the frame 21. The frame 21 also carries a stud 65 upon which a large roller 64 is freely rotatable.

The sprocket 27 has a roller 66 carried adjacent thereto by a suitable stud 67 supported on the frame 21. The stud 67 also forms a pivot for a movable bracket 68. The movable bracket 68 carries a fixed stud 69 forming a support for a roller 70.

The movable bracket 68 has a slot 71 formed therein and a pin 72 carried by the frame 21 extends into the slot and limits the movement of the bracket 68.

In threading the machine the bracket 68 may be swung outward to the left as found in Figure 1, thereby moving the roller 70 away from engagement with the sprocket 27. A roller 73, similar to the roller 66 is positioned adjacent to the lower face of the sprocket 27 and a second roller 74 is carried by a bracket 75.

As the bracket 75 is similar to the bracket 68 it need not here be described in detail.

The film leaving the roller 70 contacts the roller 76 carried by the frame 21 on a suitable stud, and forms a loop 77 after which it enters the film gate 40.

At the lower end of the film gate the film is engaged by the intermittent sprocket 31.

After leaving the film gate the film is engaged, while being threaded, by a stud 78 which forms a portion of an automatic loop making device. A bracket 79 is pivoted on a stud 80 carried by the frame 21 and is engaged to suitable spring means 84 adapted to return it in either one of two positions. The bracket 79 is provided with a shaft 81 upon which a roller 82 is free to rotate. The stud 78 is supported on an extending arm 83 of the bracket 79.

A roller 85 is freely mounted on a stud 86 carried by the frame 21. This roller is so supported on the frame 21 that it is engaged by the roller 82 when the bracket is in its extreme upper position.

Rollers 87 and 88 mounted on studs 89 and 90 respectively are positioned on each side of the optical unit 55.

Rollers 91 and 92 are positioned and adjacent to the lower end of the optical unit 55 and form part of what might be termed a "sound film gate".

When the machine is being threaded the bracket together with the members carried thereby is thrown down into the position shown in dotted lines, after which the film is brought over the stud 78, as shown in dotted lines, beneath the roller 85, over the roller 87, under the rollers 91, 92, over the roller 88 and around the sprocket 28. The bracket 79, together with its assembly, is then swung outwardly to the position shown in solid lines thereby automatically forming a loop in the film between the lower end of the film gate and the roller 85.

The film passing around the sprocket 28 is engaged by a suitable bracket member 93. After leaving the sprocket 28 the film passes around a roller 94 and thence to the sprocket 27 and from the sprocket 27 to the sprocket 26 via the rollers 64 and 61 and from the sprocket 26 the film passes via the roller 59 to the new and improved film holder which will presently be described.

Suitable linkages are provided between the motor 22, the various sprockets and the intermittent mechanism to positively drive all of said members in definite timed relation to each other.

The film holder shown more in detail in Figures 3 and 5, consists of a plurality of frames, one frame, generally designated by the numeral 105, being comprised of uprights 95 and 96 secured together by cross members 97 and 98 and another frame, generally designated by the numeral 106, comprised of uprights 99 and 100 secured together by cross members 102, 101. The two members are hinged together by means of hinges 103, 104 secured to the uprights 96 and 99. A shaft 107 is positioned at the upper end of the frame 105 and is provided with suitable bearings in the uprights 95 and 96. One of these bearings is designated by the numeral 108 in Figure 5. The shaft 107 has secured thereto a gear 109 and a chain sprocket 110. The shaft 107 also carried a plurality of rollers 111 which may be made of any kind of material. In the preferred form of the invention these rollers are made of oil impregnated hardwood.

The rollers 111 are provided with center holes which form a free working fit with the shaft 107. The mid-portions 112 of the rollers 111 are grooved so that the face of the film containing the emulsion will not become scratched.

A floating washer 113 is positioned between each two adjacent rollers and between the end rollers 111 and shoulder washers 114 carried by the shaft 107. The floating washers 113 are of a larger diameter than that of the rollers 111 and thereby serve as guides for the film.

A shaft 115 is supported near the lower end of the frame 105 in the same manner as the shaft 107 is supported. The shaft 115 carries rollers 111, floating washers 113 and shoulder washers 114 similar to those carried by the shaft 107. The shaft 115 also carries a chain sprocket 116 which is connected in driving relation to the sprocket 110 by means of a chain 117. A gear 118 suitably supported on the upright 95 meshes with the gear 109. The shaft 115 also carries a gear 119 which is keyed to and driven by the sprocket 116. A gear 120 suitably supported on the upright 95 meshes with the gears 119.

The frame 106 carries at its upper end a shaft 121 which is mounted in the same manner as the shaft 107 which carries similar rollers, floating washers and shoulder washers.

A chain sprocket 122 is secured to the shaft 121 and a gear 123 is suitably keyed to the shaft 121. This gear, when the frames 105 and 106 are folded together, meshes with the gear 118. The chain sprocket 122 is driven by means of a chain 124 passing around a sprocket 125 which is keyed to the shaft 23 so that when the projector is operated the shaft 121 is driven in definite timed relation to the speed of the projector.

It will be noted in the embodiment shown in Figure 1 that the sprocket 125 is larger than the sprocket 122 but as the rollers 111 are smaller in diameter than the film sprockets 26, 27, etc., the shaft 121 rotates at a higher speed than that of the shafts carrying the sprockets 26, 27, 28. If the rollers 111 are made with the same diameters as that of the film sprockets the shaft 121 would be driven the same speed as the shaft 23.

The gear 118 which meshes with the gear 123 forms an idler connecting the gear 123, the gear 109 and also serves to insure that the shafts 121 and 107 rotate in the same direction.

The frame 106 carries at its lower end a shaft 126 which is mounted in the same manner as the shaft 107, 115 and 121 and which carries similar rollers 111, floating washers 113 and shoulder washers 114.

The shaft 126 has keyed thereto a gear 127. When the frame is folded together as above described the gear 127 meshes with the gear 120. The shaft 115 is rotated by means of the chain 117 above described and the shaft 126 is rotated through the medium of the gears 119, 120 and 127. From this it will be noted that all of the shafts in the film holder rotate in the same direction and at the same rate of speed. The rollers 111 do not fit tightly on the shafts so that the friction of the rollers 111 and of the floating washers 113 only exert enough force on the film to move it.

With the frame open as shown in Figure 3, the film 60 is wound about the rollers, beginning on frame 105, for example, in a right hand direction, leaving a free end 128. When the lower right hand roller is reached a loop 131 is formed passing over the lower ends of the uprights 96 and 99 after which the rollers in the frame 106 are filled going in a left hand direction and leaving a free end 129. The ends 128 and 129 may be secured together by making a joint designated by the numeral 130.

When the frames are folded together, as shown in Figures 1, 2 and 4, the portions 128 and 129 above described, joined together at 130, form a loop of sufficient length to thread through the projector.

As the film is delivered out of and taken back into the holder at exactly the same rate that it passes through the projector there is no undue strain on the film at any time.

In a conventional type of continuous projector where the inner and outer ends of the film, carried on a reel, are secured together there is tremendous wear on the film in the mechanism for putting it in and taking it out of the reel and the film itself is scratched and otherwise worn due to friction between adjacent turns or convolutions.

With the herein disclosed new type of film holder including positively driven shafts in definite timed relation to the movement of the projector mechanism there is no strain on either the feed portion of the film or the take up portion, resulting in substantial increase in the life of the film.

The improved film holder may be provided with a suitable cover 132 having a suitable opening 133 adjacent to the rollers 57 and 59 through which the film may pass out and return to the holder.

Another form of loop setting device is shown in Figure 13, in which a film sprocket 134 is pivoted on a shaft 135 having a gear 136 secured thereto. A second film sprocket 137 is positioned on a shaft 138 and is provided with a gear 139. The gears 136 and 139 are provided with pointed teeth similar to those used in wringers so that another gear, such as that designated by the numeral 140, having the same form of teeth may be caused to mesh therewith. If the teeth were of involute or cycloidal form they might engage endwise in their outer diameters without meshing therefore it is preferable to have them pointed, as shown.

The gear 140 is mounted on a suitable stud shaft 141 carried by a movable member 142. Suitable guide rollers 143 and 144 are positioned adjacent to the film sprocket 134 and similar guide rollers 145, 146 are positioned adjacent to the film sprocket 137. Guide rollers 147 and 148 may be positioned in line with the film gate 149 to guide the film entering and leaving the latter. The film gate 149 may be provided with a suitable intermittent movement, for example, a sprocket driven by a "Geneva" motion (not shown), or a claw movement of the usual type may be used.

When threading the machine up the movable member 142 is moved to the right to the position shown in Figure 13 after which the film is passed between the rollers 143, 144 around the sprocket 134, over the roller 147, through the film gate 149 and over the roller 148 and thence between the rollers 146, 145 and the sprocket 137, without making any attempt to form loops in the film.

After the film is placed around the rollers and sprockets as above described the movable member 142 is moved to the left thereby bringing the gear 140 in line with the gears 136, 139. As the gear 140 is moved to the left in the direction of the arrow its teeth mesh with the teeth of the gears 136 and 139 and slightly rotate the latter gears in the directions indicated by the arrows thereby forming the loops 150 and 151 (shown in dotted lines).

Referring to Figure 8, light from the objective lens 41 of the projector falls upon a screen designated generally by the numeral 152. The screen 152 consists of a translucent sheet or member 153 molded between the plane surfaces of the plano-convex lenses 154 and 155 which together form a convex-convex lens with the translucent member centrally positioned therein on a plane at right angles to the center axis of the lens. In another embodiment one or both (as preferred) of the plane surfaces may be ground and this ground surface may be used to take the place of the translucent sheet or member 153. In this case the two lenses would be made separately and assembled together after one or both of the plane surfaces were ground.

The projected beam of light passes via the convex surface 154 to the translucent member 153 and is viewed through the convex surface 155. The screen 152 is preferably molded in one piece and the portions on either side of the translucent member 153 may be made of any suitable transparent material.

A modified form of the screen shown in Figure 12 consists of a concavo-convex lens 156 and a concavo-convex lens 157 with a translucent member 158 positioned therebetween. The lenses 156 and 157 are provided with annular serrations 159, the serrations of one lens matching the serrations of the other lens to form a fit with the center axis of the lenses in line with each other. After assembling, a suitable ring 160 is spun onto the lens assembly thereby permanently securing them together. The picture is projected onto the translucent member 158 via the lens 157 and the picture is viewed through the lens 156.

The new and improved screen shown in Figures 8 and 12 produce pictures which apparently have substantial depth. Another advantage obtained with these screens is that pictures projected thereon may be viewed in daylight throughout a wider angle and with more perfect definition than possible heretofore with existing types of screens.

The modification shown in Figures 9, 10 and 11 is similar to the screen shown in Figure 8 with the exception that the member through which the picture is observed has its surfaces serrated. It consists of a translucent sheet or member 161 molded between the plane surfaces of a plano-convex lens 162 and a plano-convex lens 163 which together form a convex-convex lens with the translucent member positioned therein on a plane at right angles to the center axis of the lens.

The convex surface of the lens 163 has its surface formed into a series of teeth or serrations 164 through which the picture is viewed. While these serrations are shown in the form of teeth the invention is not limited to the exact form shown in the drawings; for example, the included angles forming the teeth may be made of any desired value or they may be made circular on any desired radius. The purpose of these serrations is to give the picture a greater apparent depth.

The combination in a projector of the new and improved film holder shown in Figures 1, 2, 3, 4, and 5; the new and improved shutter which cools the film at the aperture, a condensing lens, and the projection lamp; the new and improved loop forming device; and the new and improved screen form a simple and efficient projector in which the film may run indefinitely without appreciable wear and in which the projected picture has great depth and a wider view angle than heretofore.

The use of rollers 111 formed of oil impregnated wood or the like furnishes the film with a very light coating of lubricant and further tends to reduce the wear and tear on the film.

Although the invention has been disclosed in connection with the specific details of preferred embodiments thereof, it must be understood that such details are not intended to be limitative of the invention except in so far as set forth in the accompanying claims.

It is also understood that the automatic loop forming device is equally applicable to cameras as well as projectors and the provision of an automatic loop forming device, such as is shown in Figure 13, in a camera would enable an amateur motographer to very quickly thread a camera without having to pay any attention to the loops which are a great "bugbear" in existing cameras.

What is claimed is:

1. In a motion picture device, a motion picture film strip, a frame, a film gate, a sound gate spaced apart from said film gate and including a series of free rollers defining a path which said film strip must follow to pass to and from said sound gate with a minimum of sprocket tooth ripple, said series being spaced apart from said film gate, a bracket pivotally mounted on said frame, a shaft carried by said bracket, a roller pivotally mounted on said shaft and adapted normally to engage one of said free rollers for holding the film in contact therewith, an arm formed integral with said bracket, a stud carried by said arm and having an axis parallel to said shaft, said stud being normally spaced apart from said film, means for pivotally swinging said bracket to a threading position to disengage the engaging roller from the free roller with which it is normally in engagement and to utilize said stud for obtaining a measured length of film between said film gate and said series of rollers adapted to form a loop between said film gate and the first free roller in said series when said bracket is thrown to its normal position, and a sprocket spaced apart from said series of free rollers for pulling said film strip therethrough along said path.

2. In a motion picture device, a motion picture film strip, a frame, a film gate, a sound gate spaced apart from said film gate, a series of free rollers for guiding the film to and from said sound gate, some of which are positioned between said gates, said series of free rollers being provided for carrying the film strip with a minimum of sprocket tooth ripple, an arm pivoted on said frame, an engaging roller carried by said arm and normally positioned in engagement with one of said free rollers positioned between said gates, a stud carried by said arm and spaced apart from said engaging roller whereby when said arm is turned to disengage the latter from said last free roller for threading the device, said stud and said free roller define a predetermined length of film between said film gate and said sound gate adapted to form a loop when the arm is turned to re-engage said engaging roller with said last free roller, and a sprocket spaced apart from said series of free rollers for pulling said film strip along a path formed by said free rollers.

WILLIAM J. MORRISSEY.